Patented Aug. 13, 1929.

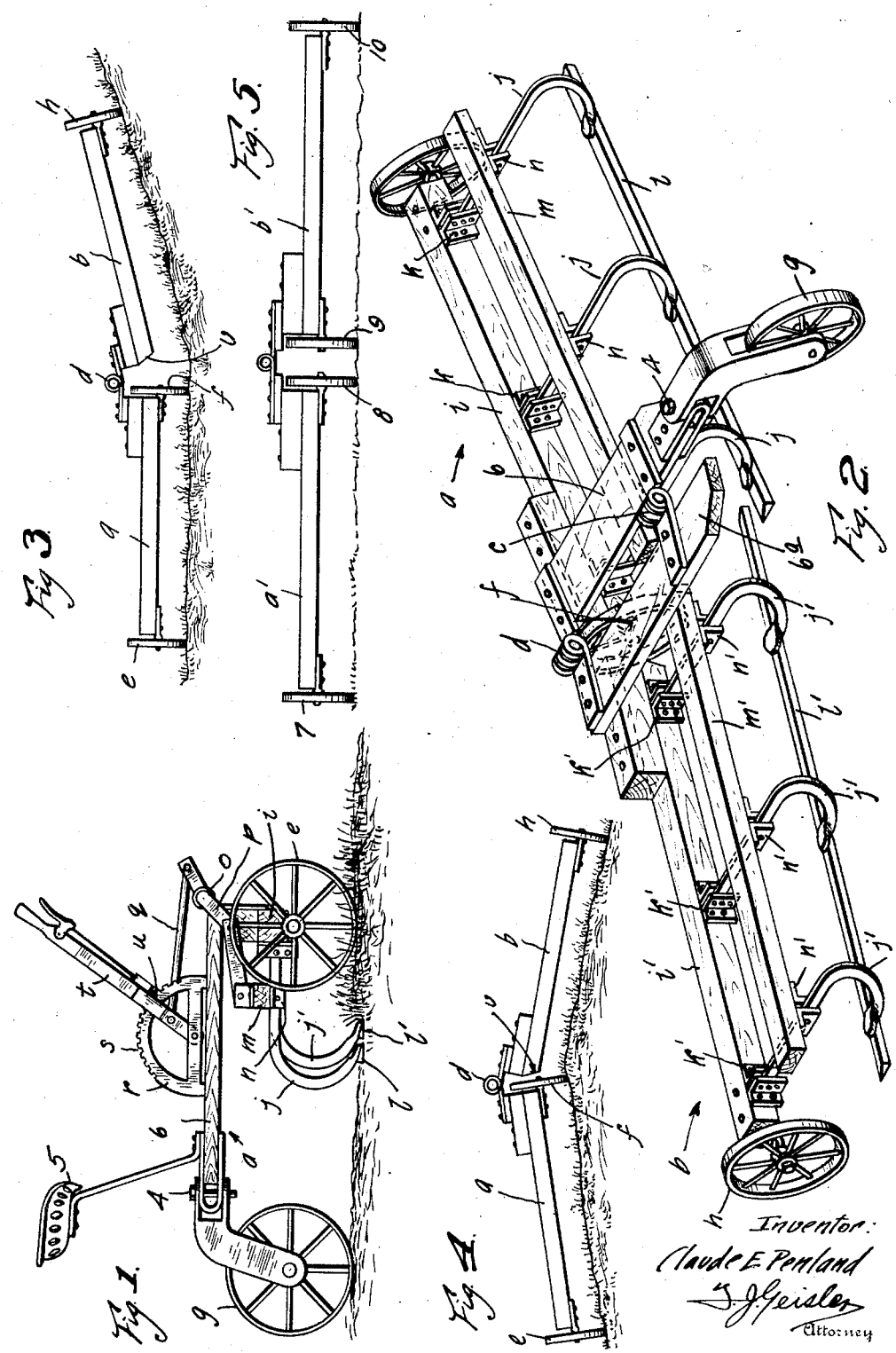

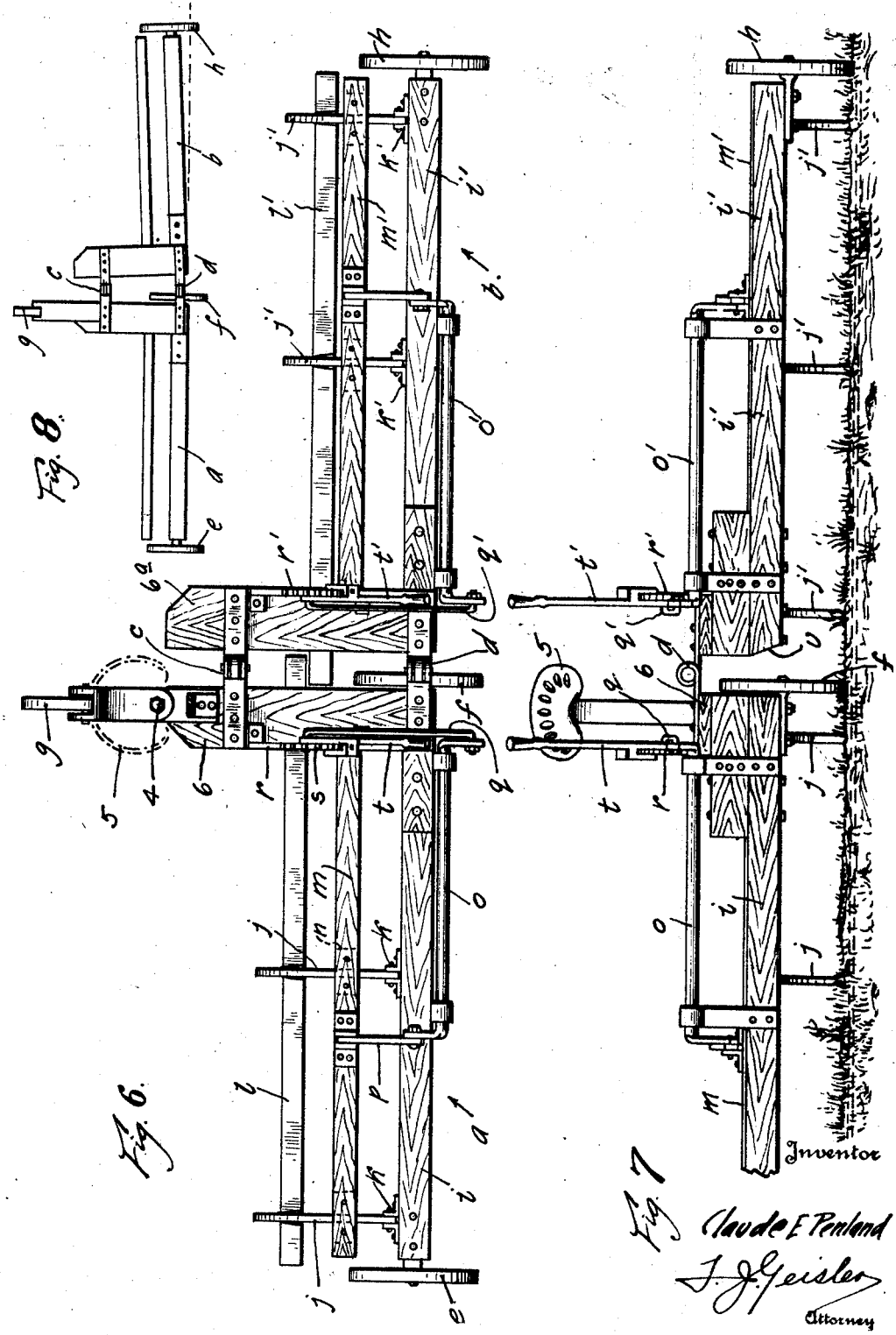

1,724,143

UNITED STATES PATENT OFFICE.

CLAUDE E. PENLAND, OF PENDLETON, OREGON.

AGRICULTURAL IMPLEMENT.

Application filed October 26, 1926. Serial No. 144,326.

My invention relates to an agricultural implement, especially such as intended to be employed in weeding or otherwise cultivating rolling, rough and uneven ground.

My agricultural implement is particularly intended for large ranches where it is the practice to allow a number of the fields to lie fallow each year, and during this time it is necessary that they be frequently cultivated to prevent weeds and wild grasses from springing up.

In these sections of the country where this is the practice, the ranches are frequently of great extent, and the terrain is rolling and quite rough, and an implement of considerable width is desirable for covering as much ground at one time as practicable, otherwise the cultivating of these fields becomes a slow and laborious operation.

The implement heretofore provided for this work did not operate efficiently because it was made with an inflexible frame, therefore, the blade is lifted clear of the ground when passing over a depression, such as along the bottom of a swale, where the side wheels tend to ride on the slopes leaving the lower portions of the ground uncultivated; and likewise when passing along the crest of a rise where the ground will be highest in the center, the blade tends to dig deeply into the soil, even so far as to lift the side wheels clear of the ground, and thus permitting the implement to operate only for part of its length.

Furthermore, the digging-in unduly of the implement in the crest of the hill would greatly increase the tractive power required for operating the implement.

The principal object of my invention is to provide a wheeled weeder adapted to cover a strip of ground of from 16 to 24 feet wide at one time, and at the same time adaptable for conforming to the major inequalities of the ground within this width.

A further object of my invention is to provide an efficient weeder simply and economically constructed to function with a minimum of tractive power.

And a still further object of my invention is to apply my improvement to the type mentioned in which the driver or operator will be seated on one section of the weeder adjacent the operating levers, provided on each section for controlling the operating devices carried by the sections, respectively.

I attain my object by providing a weeder or the like comprising a wheeled frame or body formed of sections hinged together on an axis permitting either section angular movement in a vertical plane, with respect to the other section, the hinge joint being adapted to permit relative limited lateral play to the sections, the adjacent ends of the frame-sections being adapted to accommodate the said angular movement, one of the frame-sections being provided with a rearwardly extending part, supported by a supplemental wheel, the said rearwardly extending part being provided with a seat or station for the operator, and the sections being provided with devices located adjacent said station for controlling the operating devices carried by the sections, respectively.

Further details of my invention as to its construction and mode of operation are hereinafter fully described with reference to the accompanying drawings, in which:

Fig. 1 shows a side elevation of my weeder and illustrates the arrangement of the wheels, the seat, the operating levers, and the weeder blades;

Fig. 2 shows a perspective view of my weeder with the upper parts removed, and illustrates how the sections are hinged together;

Fig. 3 shows diagrammatically my weeder adjusting itself to the contour of the ground at the bottom of a swale;

Fig. 4 shows diagrammatically similarly to Fig. 3 my weeder adjusting itself to the contour of the ground on the ridge at the top of the swale;

Fig. 5 shows diagrammatically the relative adjustment of my weeder on level ground and illustrates a modification in which the weeder sections are provided with ground wheels at each end;

Fig. 6 shows a plan view of my weeder and illustrates how the sections are hinged together and the relative arrangement of the weeder blades;

Fig. 7 shows a front elevation of my weeder and illustrates further details of construction; and Fig. 8 shows diagrammatically how my weeder sections are adapted for limited lateral movement.

My agricultural implement comprises a weeder or cultivator in two longitudinal sections $a$ and $b$ connected end to end by hinged couplings $c$ and $d$. The section $a$ is provided with side wheels $e$ and $f$ and a trailer wheel $g$, and the section $b$ is provided with a side wheel $h$ on its far end, and is connected to and supported by the section $a$ at its near end by the hinged couplings $c$ and $d$, which are adapted for movement in a vertical plane.

The hinged couplings $c$ and $d$ are so constructed as to also allow a limited lateral movement to provide adjustment to strains in that direction, Fig. 8.

The section $a$ comprises a horizontally extending beam $i$ to each end of which the side wheels $e$ and $f$ are fixed for rotation, and is provided with arcuate pendent arms $j$ hinged for vertical movement at $k$ and fixed to and supporting at their other ends a cutter or weeder blade $l$. A horizontally extending brace beam $m$ is fixed across the shank portions of the arcuate arms $j$ by shackles $n$. A rock shaft $o$ is connected at one end to approximately the middle point of the brace beam $m$ by a link $p$, and at its other end to the elevating lever $t$ by a link $q$. The elevating lever $t$ is pivoted to the base of a quadrant and said quadrant is provided with notches $s$, in which a spring controlled pawl $u$ fixed to the lever $t$, meshes.

To the rear of the inner end of the section $a$ the trailer wheel $g$ is fastened for horizontal movement as at 4, and a seat 5 is fixed on a platform 6 adjacent the lever $p$, upon which the said lever is also supported.

The section $b$ is similarly constructed except that no side wheel, similar to the wheel $f$ on the section $a$ and no trailer wheel nor seat is provided and the inner end of the beam $i'$ is cut off at an angle as at $v$ to provide clearance for the wheel $f$ when the section $b$ is in an angular position with reference to the section $a$ as shown in Figs. 3 and 4.

The arcuate arms $j'$ on the section $b$ are provided with somewhat shorter shank portions than the arms $j$ thereby offsetting the weeder blade $l'$ from the weeder blade $l$ so that the two blades will not interfere when the two sections are in an angular position with each other as shown in Fig. 2.

The platform 6 on the section $a$ provides the seat for the operator, and the elevating levers $t$ and $t'$ on the sections $a$ and $b$ are conveniently arranged to be operated from the said seat, thus the section $b$ does not support any other weight than its own, though a similar platform $6^a$ is provided on the section $b$ on which the operator may stand or brace himself with his feet, that is, the hinges $c$ and $d$ are of sufficient strength to support any weight likely to be put upon them.

The arcuate arms $j$ and $j'$ are formed to hold the blades $l$ and $l'$ in the ground at such an angle that the blades will neither tend to dig deeper nor rise out of the soil, but will ride at a uniform depth.

In the use of my implement for weeding or cultivating a rough and rolling country, the flexibility provided by the hinges $c$ and $d$ allow the center of the cultivator to be on a higher or lower level than the end, or one end may be on a higher or lower level than the other as shown in Figs. 3 and 4.

The weeder blade $l'$ is offset in the direction of draft from the weeder blade $l$ by the arcuate arms $j'$ having somewhat shorter shank portions than the arms $j$, and the said blades overlap somewhat at their adjacent ends so that when the section $b$ is on a lower level than the section $a$, the adjacent ends of the blades will not interfere, being offset, and when the section $b$ is on a higher level, than the section $a$, the adjacent ends will be drawn apart, but as they overlap when in normal position, there will be no space between these ends when drawn apart and no uncultivated strip will appear in the center of the path covered by my cultivator.

In Fig. 5, I show each section of my implement independently supported by side wheels 7 and 8 on section $a'$ and 9 and 10 on section $b'$, but otherwise the same in all respects as to construction and operation.

Thus, in short, I have provided an agricultural implement adapted to conform to the inequality of the ground, which at all times will hold its blades a uniform and predetermined depth in the soil, and which will leave no uncultivated areas within its path, and which will function efficiently under all the above conditions.

I claim:

1. In an agricultural implement the combination of, a wheeled frame formed of sections hinged together along the longitudinal axis of the implement, permitting angular movement of either section with respect to the other, the hinged joint being adapted to permit relative limited lateral play to the sections, the inner end of one of said sections being cut away to accommodate the said angular movement, each of said sections carrying devices comprising pendent curved arms carrying on their ends an earth working tool, at such an angle with the horizontal as to neither tend to rise from the ground or to dig more deeply therein and said devices of their respective sections also being off-set laterally one from the other so as not to interfere in the angular movement of the sections nor to leave an uncultivated strip therebetween.

2. In an agricultural implement the combination of, a wheeled frame formed of sections hinged together along the longitudinal axis of the implement, permitting angular movement of either section with respect to the other, the hinged joint being adapted to permit relative limited lateral play to the sections, the inner end of one of said sections being cut away to accommodate the said angular movement, each of said sections carrying adjustable devices comprising pendent curved arms carrying on their ends an earth working tool, at such an angle with the horizontal as to neither tend to rise from the ground or to dig more deeply therein and said devices of their respective sections also being off-set laterally one from the other so as not to interfere in the angular movement of the sections nor to leave an uncultivated strip therebetween.

3. In an agricultural implement the combination of, a wheeled frame formed of sections hinged together along the longitudinal axis of the implement, permitting angular movement of either section with respect to the other, the hinged joint being adapted to permit relative limited lateral play to the sections, the inner end of one of said sections being cut away to accommodate the said angular movement, one of the frame sections being provided with a rearward extending part supported by a supplemental ground wheel, each of said sections carrying adjustable devices comprising pendent curved arms carrying on their ends an earth working tool, at such an angle with the horizontal as to neither tend to rise from the ground or to dig more deeply therein and said devices of their respective sections also being off-set laterally one from the other so as not to interfere in the angular movement of the sections nor to leave an uncultivated strip therebetween.

CLAUDE E. PENLAND.